United States Patent [19]

Krude

[11] Patent Number: 5,067,929
[45] Date of Patent: Nov. 26, 1991

[54] CONSTANT VELOCITY RATIO UNIVERSAL JOINT

[75] Inventor: Werner Krude, Neunkirchen-Wolperath, Fed. Rep. of Germany

[73] Assignee: GKN Automotive AG, Siegburg, Fed. Rep. of Germany

[21] Appl. No.: 561,972

[22] Filed: Aug. 2, 1990

[30] Foreign Application Priority Data

Aug. 4, 1989 [DE] Fed. Rep. of Germany ....... 3925857

[51] Int. Cl.$^5$ .............................................. F16D 3/30
[52] U.S. Cl. ..................................... 464/145; 464/903
[58] Field of Search ............... 464/143, 144, 145, 146, 464/903, 906

[56] References Cited

U.S. PATENT DOCUMENTS

| | | | |
|---|---|---|---|
| 1,975,758 | 10/1934 | Stuber | 464/145 |
| 2,006,026 | 6/1935 | Midthun | 464/145 |
| 3,076,323 | 2/1963 | Aucktor | 464/145 |
| 3,186,189 | 6/1965 | Cull | 464/145 |
| 3,287,934 | 11/1966 | Asher | 464/145 X |
| 4,116,020 | 9/1978 | Aucktor et al. | 464/903 X |

Primary Examiner—Thomas R. Hannon
Attorney, Agent, or Firm—Toren, McGeady & Associates

[57] ABSTRACT

A constant velocity ratio universal joint, comprising an outer joint member (1), an inner joint member (14), tracks (2, 15) circumferentially spaced in meridian planes about the joint members and facing one another in pairs, a plurality of balls (13) received one in each facing pair of tracks, and a cage (11) between the joint members and holding the balls with their centers in a common plane; wherein the cage has a part-spherical outer surface engaging a part-spherical guide surface with a first portion provided in the outer joint member between the tracks therein and a second portion in a base member (5) connected to the outer joint member at its largest diameter end. The tracks in the joint members are of non-undercut configuration considered from such end of the outer joint member, as is the first guide surface portion therebetween, while the guide surface portion in the joint base member is non-undercut in the opposite direction. Thus, the joint members and base member are able to be manufactured by forming operations not requiring machining.

3 Claims, 2 Drawing Sheets

CONSTANT VELOCITY RATIO UNIVERSAL JOINT

BACKGROUND TO THE INVENTION

1. Field of the Invention

This invention relates to a constant velocity ratio universal joint, comprising an outer joint member having in its interior a plurality of ball-receiving tracks, spaced circumferentially from one another about a rotational axis of the outer joint member and having centre lines which lie in meridian planes; an inner joint member having a plurality of ball-receiving tracks with centre lines which lie in meridian planes about a rotational axis of the inner joint member, facing the tracks in the outer joint member in pairs; a plurality of balls disposed one in each facing pair of tracks in the joint members; and a control element holding the balls with their centres in a common plane and having an external surface engaging a part-spherical guide surface of the outer joint member between the tracks thereof; the tracks in the joint members being undercut-free considered from one end of the outer joint member and the outer joint member having a joint base member attached there at said one end. Such a constant velocity ratio universal joint will hereafter be referred to as a joint of the kind specified.

2. Description of Prior Art

A joint of the kind specified is disclosed in DE-3132364C, wherein the joint base member is formed by a wheel hub part with an inserted sheet metal cap. The joint has a disadvantage, however, in that the part-spherical guide surface in the outer joint member is not undercut-free, requiring it to be produced either by a machining operation involving material removal from the interior of the outer joint member, or an extremely complicated collapsible tool for forming it in an operation which does not involve the removal of material. Further, the joint can only be assembled by over-articulating it to enable the balls to be inserted individually.

A constant velocity ratio universal joint is disclosed in DE-3209596C, wherein the outer joint member has an undercut-free guide surface engaged by the inner joint member, but, instead of the conventional ball cage, there is provided a supporting member in the form of a part-spherical shell, engaging a part-spherical guide face in the joint base member. This design has a disadvantage that when the joint is articulated only half the total number of balls are engaged by the supporting member.

SUMMARY OF THE INVENTION

It is the object of the present invention to provide a joint of the kind specified wherein both the inner and outer joint members are of an undercut-free design, suitable for production by relatively simple processes not involving removal of material, but which nevertheless provides for accurate guidance of the control element by guide surfaces of adequate dimensions.

According to the invention, we provide a constant velocity ratio universal joint of the kind specified, wherein said part-spherical guide surface engaged by the external surface of the control element comprises a first portion in said outer joint member and a second portion in said joint base member, said first portion being undercut-free considered from said one end of the outer joint member, and said second portion being undercut-free in the opposite axial direction.

Thus, in a joint according to the invention, both the outer joint member and joint base member can be produced by simple tools in, for example, a cold extrusion process or similar modern production process. Assembly of the joint is easy, in that the balls can be inserted radially before the outer joint member and joint base member are connected together, such assembly being suitable for automation using tools which are relatively easy to control.

A circumferential relief may be provided between the first and second portions of the guide surface, where the outer joint member is attached to the joint base member. The annular space thus provided improves lubrication at the control element, and reduces the requirements for accuracy in production of the parts.

The outer joint member, at said one end thereof where it is attached to the joint base member, may have a surface expanding frusto-conically from the largest diameter of its first guide surface portion, while the joint base member has a projection with an external surface of frusto-conical configuration and having its second portion of the guide surface formed therein. The advantage of this design is that the second portions of the guide surface is formed in a region of the joint base member which is of the required radial thickness for advantageous forming operations. Even when the outer joint member and joint base member are connected, however, there preferably remains an axial space between the opposed frusto-conical faces.

The outer joint member and joint base member may be provided, radially outside their frusto-conical faces, with complementary annular centering faces which are not interrupted by the ball-receiving tracks. However, it would alternatively be possible for the outer joint member and joint base member to be centered by their guide surfaces with which they guide the control element of the joint.

It is advantageous if, when the control element and balls are present, the balls contacting the tracks in both joint members and the control element contacting the second portion of the guide surface in the joint base member, there is an axial clearance between opposed faces of the outer joint member and joint base member. This ensures that there is sufficient play at the control element relative to the guide surfaces.

In a first embodiment of joint according to the invention, for guiding the balls to the angle-bisecting plane when the joint is articulated, the centre lines of the contact points of the balls in the ball-receiving tracks of the outer and inner joint members may have centres of curvature axially offset in opposite directions relative to the centre of joint articulation. This controls the balls very effectively, since high control forces are exerted thereon.

Alternatively, the ball-receiving tracks in the two joint members may have centres of curvature positioned on a common line extending through the centre of joint articulation.

In the former case, the control element may be guided only by engagement with the two portions of the guide surface in the outer joint member and joint base member.

In the latter case, the control element must be guided relative to both the inner and outer joint members, by having part-spherical faces on its exterior and in its interior, with centres of curvature offset by substantially equal amounts on opposite sides of the centre of joint articulation. It is possible to combine both the above described expedients for guiding the balls into the bisector plane.

The control element may be a conventional cage, having windows or apertures wherein the balls are received, or it may have ball-receiving recesses which are axially open at its end which is opposite the joint base member. In this latter case, it is possible for the cage to be assembled axially to the inner joint member, by passing it through the ball-receiving tracks in the inner joint member, and subsequently turning it circumferentially by the width of a track.

The track centre lines preferably comprise arcuate portion followed by tangential straight portions.

Assembly of a joint according to the invention, which has the usual design of cage for a control element, is preferably carried out by inserting the inner joint member into the cage while these components have their axes orientated perpendicular to one another. The cage is then turned to bring the axes into coincidence. The balls are inserted radially into the cage, and the outer joint member fitted over the inner joint member, balls and cage in a coaxial movement, the joint base member being fitted by a coaxial movement in the opposite direction. The joint base member and outer joint member may then be secured together, for example by welding, by use of a securing ring, or by the fitting of a rolled-on sheet metal cap or the like.

BRIEF DESCRIPTION OF DRAWINGS

The invention will now be described by way of example with reference to the accompanying drawings, of which.

DESCRIPTION OF PREFERRED EMBODIMENT

Figure 1:
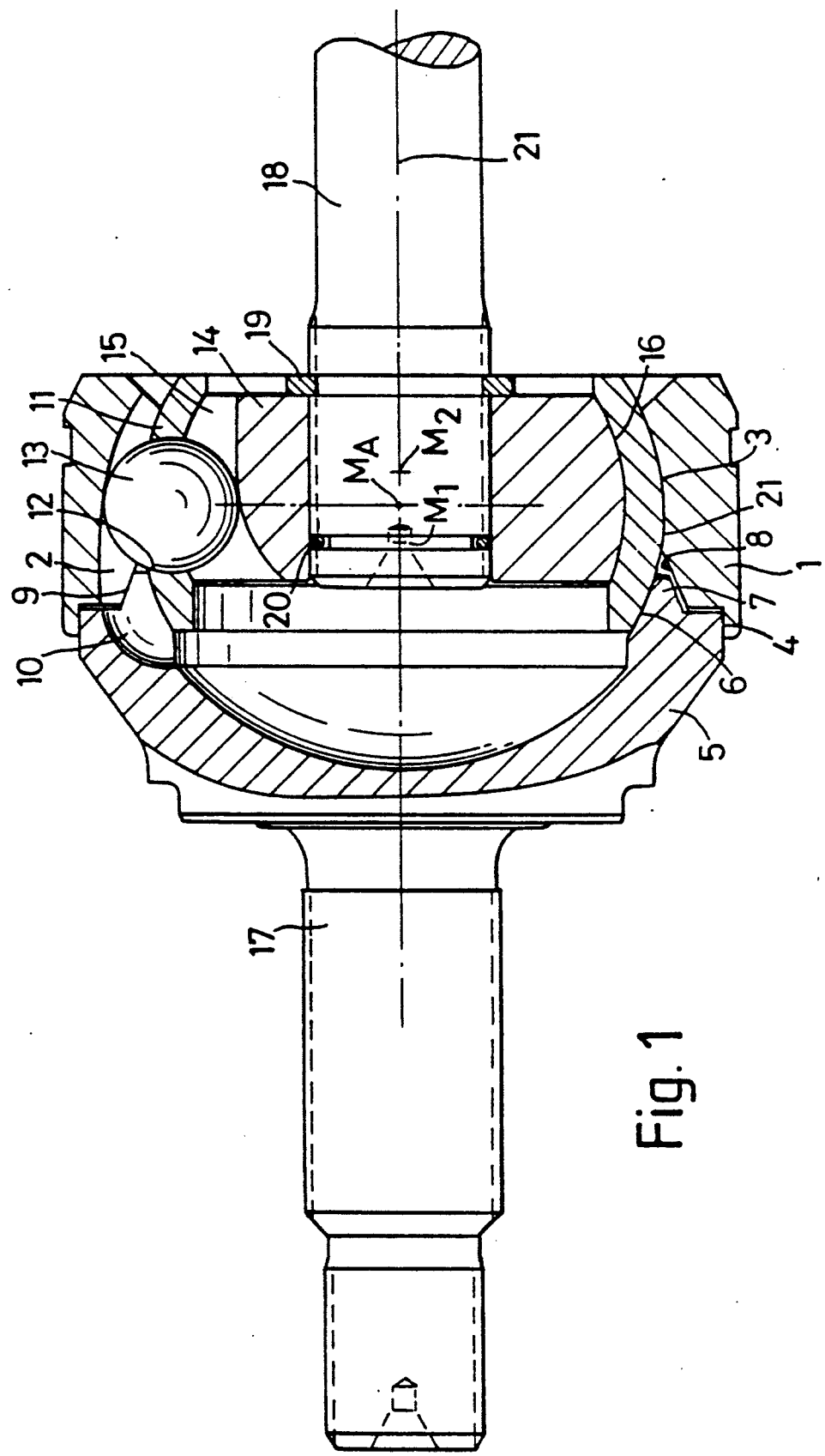
FIG. 1 is a longitudinal section through a joint according to the invention.

The joint shown in FIG. 1 comprises an outer joint member 1, provided in its interior with a plurality of ball-receiving tracks 2. The tracks 2 are undercut-free considered from the left-hand end of the outer joint member with reference to the drawing. Between the tracks 2, the internal surface of the outer joint member comprises portions 3 of a part-spherical guide surface which also is undercut free in the same axial direction as the tracks. The joint is illustrated in the non-articulated condition wherein the respective rotational axes of the joint members are aligned as indicated at 21.

At its largest diameter end, the outer joint member is closed by a joint base member 5 which is centered relative to the outer joint member by complementary cylindrical centering surfaces 4 provided on the members. The joint base member 5 has guide surface portions 6 which are part-spherical and non-undercut considered from the right-hand, open, end of the joint base member. These guide surface portions 6 are provided in an annular projecting portion 7 of the joint base member which fits within the end of the outer joint member 1, the projection 7 and outer joint member 1 having complementary frusto-conical surfaces 9 which, however, preferably do not abut one another. Between the guide surface portions 6, the joint base member 5 has recesses or pockets 10 which are in alignment with the tracks 2 in the outer joint member. Between the frusto-conical surfaces 9 and the centering surfaces 4, the joint outer member and base member have facing radially extending surfaces, and it will be noted that there is an axial clearance therebetween.

Within the outer joint member is fitted an inner joint member 14 which has tracks 15 facing the tracks in the outer joint member in pairs. The tracks 15 are of non-undercut configuration, considered from the left-hand end of the inner joint member. A plurality of balls 13 are disposed one in each facing pair of tracks 2, 15 for torque transmission between the joint members.

Between its tracks 15 the inner joint member has a part-spherical cage guide surface 16. An annular control element in the form of cage 11 is disposed between the two joint members, the cage having windows 12 wherein the torque transmitting balls 13 are received. The cage has a part-spherical external surface which engages the guide surface portions 3, 6 in the outer joint member and joint base member. The cage also has an internal part-spherical surface which engages the surface 16 of the inner joint member. The internal and external surfaces of the cage, as well as the guide surface portions 3, 6 and the surface 16 of the inner joint member, are all concentric with their centres of curvature coinciding at the centre of articulation $M_A$ of the joint.

The centre lines of the tracks 2, 15 in the outer and inner joint members comprise, as viewed in the illustrated section in a meridian plane, a part circular portion and a tangentially adjoining straight line. The centres of curvature $M_1$, $M_2$ of the part-circular portions are axially offset by equal amounts on opposite sides of the joint articulation centre $M_A$. Such configuration of the ball-receiving tracks guides the balls to occupy the plane bisecting the angle between the axes of the inner and outer joint members when the joint is articulated. Instead of or in addition to such offset of the centres of curvature of the centre lines of the tracks in the joint members, the cage 11 could be provided with internal and external part-spherical surfaces engaging the joint members, such cage surfaces having analogously offset centres of curvature.

The joint base member 5 has a splined stub shaft 17 integral therewith. A shaft member 18 is inserted into the inner joint member, and secured by an abutment ring 19 and spring ring 20.

Between the guide surface portions 3, 6 in the outer joint member and joint base member, an annular space 21 is provided in consequence of the limited depth to which the projection 7 extends into the recess 8, the space receiving lubricant for providing improved lubrication between the cage and outer joint member.

Figure 2B:
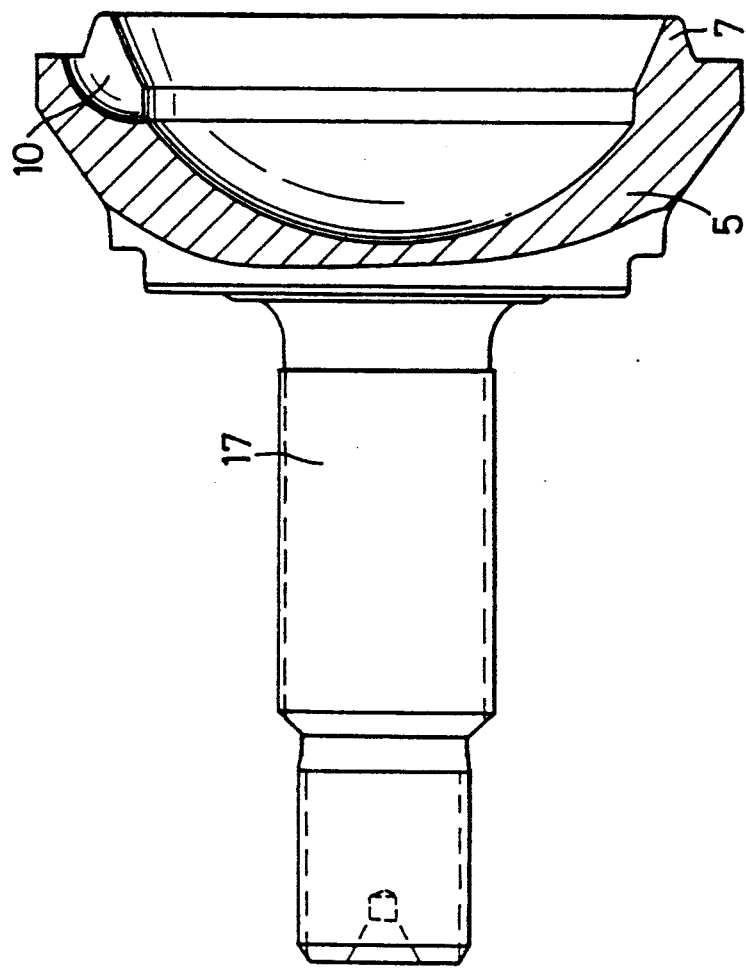
FIG. 2b is a longitudinal section of the joint base member.
Figure 2A:
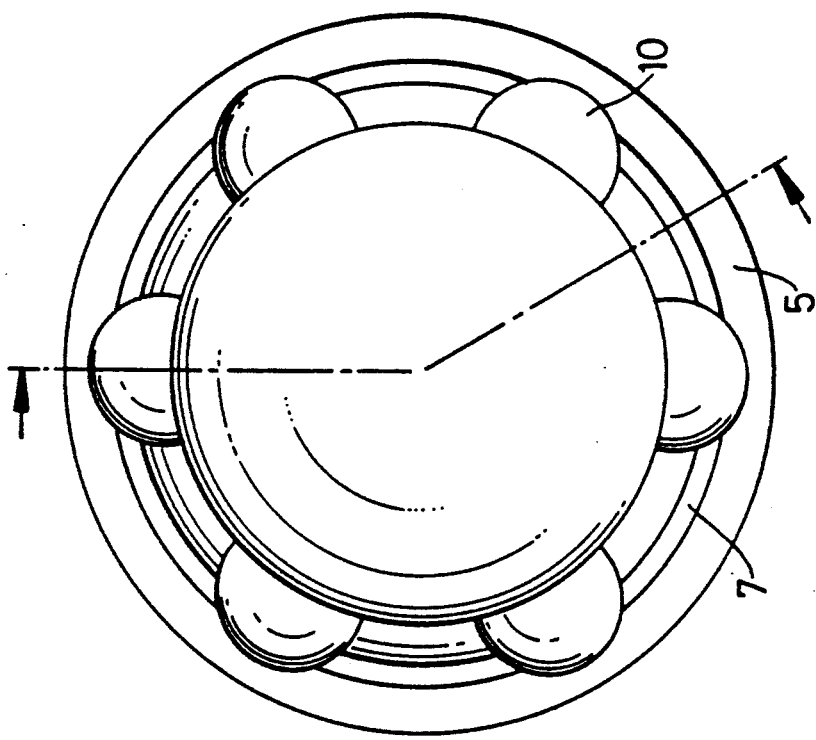
FIG. 2a is an axial view of the joint base member of the joint of FIG. 1.

FIG. 2a shows the joint base member 5, with its projection 7 having an external frusto-conical surface and the pockets or recesses 10 which divide the projection 7. FIG. 2b clearly illustrates the arrangement of the recesses 10 in the projection 7.

I claim:

1. A constant velocity ratio universal joint, comprising:
    an outer joint member having a rotational axis;
    a plurality of ball-receiving tracks in the interior of the outer joint member, spaced circumferentially from one another about said rotational axis and having center lines which lie in meridian planes;
    an inner joint member having a rotational axis;

a plurality of ball-receiving tracks provided on the inner joint member, with center lines which lie in meridian planes about said rotational axis of the inner joint member and facing the tracks of the outer joint member in pairs;

a plurality of balls disposed one in each facing pair of tracks in the joint members;

the tracks in the joint members being undercut-free considered from one end of the outer joint member;

a joint base member attached to the outer joint member at said one end;

a control element holding the balls with their centers a common plane, and having an external guide surface; and a part-spherical guide surface engaged by said external guide surface of the control element, said part-spherical guide surface comprising a first portion in said outer joint member between the tracks thereof and a second portion in said joint base member, said first portion being undercut-free considered from said one end of the outer joint member, and said second portion being undercut-free in the opposite axial direction, the outer joint member, at said one end thereof where it is attached to the joint base member, having a surface expanding frusto-conically from the largest diameter of its first part-spherical guide surface portion and the joint base member having a projection with an external surface of frusto-conical configuration and having its undercut-free second portion of the part-spherical guide surface formed with said projection.

2. A joint according to claim 1, wherein an axial space is defined between said frusto-conical surfaces of the outer joint member and joint base member.

3. A joint according to claim 1, wherein the outer joint member and joint base member are provided, radially outside their frusto-conical surfaces, with complementary annular centering faces.

* * * * *